(12) United States Patent
Wilson, Jr. et al.

(10) Patent No.: US 8,336,429 B2
(45) Date of Patent: Dec. 25, 2012

(54) SYSTEMS AND METHODS FOR MAINTAINING SHEAVE GROOVES

(75) Inventors: Robert D. Wilson, Jr., Seattle, WA (US); Christian E. Thomsen, Seattle, WA (US); James Watson, Seattle, WA (US); Keegan Carriveau, Seattle, WA (US); Max Wilson, Seattle, WA (US)

(73) Assignee: Vertical Motion Innovations, LLC, Seattle, WA (US)

( * ) Notice: Subject to any disclaimer, the term of this patent is extended or adjusted under 35 U.S.C. 154(b) by 0 days.

(21) Appl. No.: 13/401,626

(22) Filed: Feb. 21, 2012

(65) Prior Publication Data
US 2012/0210833 A1 Aug. 23, 2012

Related U.S. Application Data

(60) Provisional application No. 61/444,686, filed on Feb. 18, 2011, provisional application No. 61/444,687, filed on Feb. 18, 2011.

(51) Int. Cl.
*B23B 35/00* (2006.01)
*B23B 27/00* (2006.01)
(52) U.S. Cl. .......................................... 82/1.11; 407/70
(58) Field of Classification Search .................. 407/113, 407/114, 115, 116, 70, 102, 107, 117, 118, 407/119; 82/1.11
See application file for complete search history.

(56) References Cited

U.S. PATENT DOCUMENTS

| RE25,955 | E | * | 2/1966 | Emmons | 407/113 |
|---|---|---|---|---|---|
| 3,371,567 | A | * | 3/1968 | Davis | 82/158 |
| 3,596,337 | A | * | 8/1971 | Arnold et al. | 407/86 |
| 4,063,841 | A | * | 12/1977 | Niman, Jr. | 407/70 |
| 8,205,478 | B1 | * | 6/2012 | Hallisey | 73/1.06 |

* cited by examiner

*Primary Examiner* — Will Fridie, Jr.
(74) *Attorney, Agent, or Firm* — Puget Patent; Michael Gibbons

(57) ABSTRACT

A test kit for unevenly worn sheave grooves, a tool for regrooving sheave grooves that are found to be unevenly worn, and a method for testing for and maintaining the sheave grooves utilizing the test kit and tool. The test kit includes magnetic standards which adhere to a sheave beneath the portion of the sheave touched by the ropes, facilitating testing without having to unrope the sheave. Unevenly worn sheave grooves are visually ascertained by holding a straightedge adjacent to the magnetic standards. The regrooving tool includes a shank that can be received by a stand set up next to the sheave, a body attached to the shank, and an interchangeable cutting insert received by the body that is inserted in the sheave groove. When the sheave is rotated, the sheave groove is ground by the cutting insert, with each groove being ground sequentially until all grooves are again uniform.

4 Claims, 17 Drawing Sheets

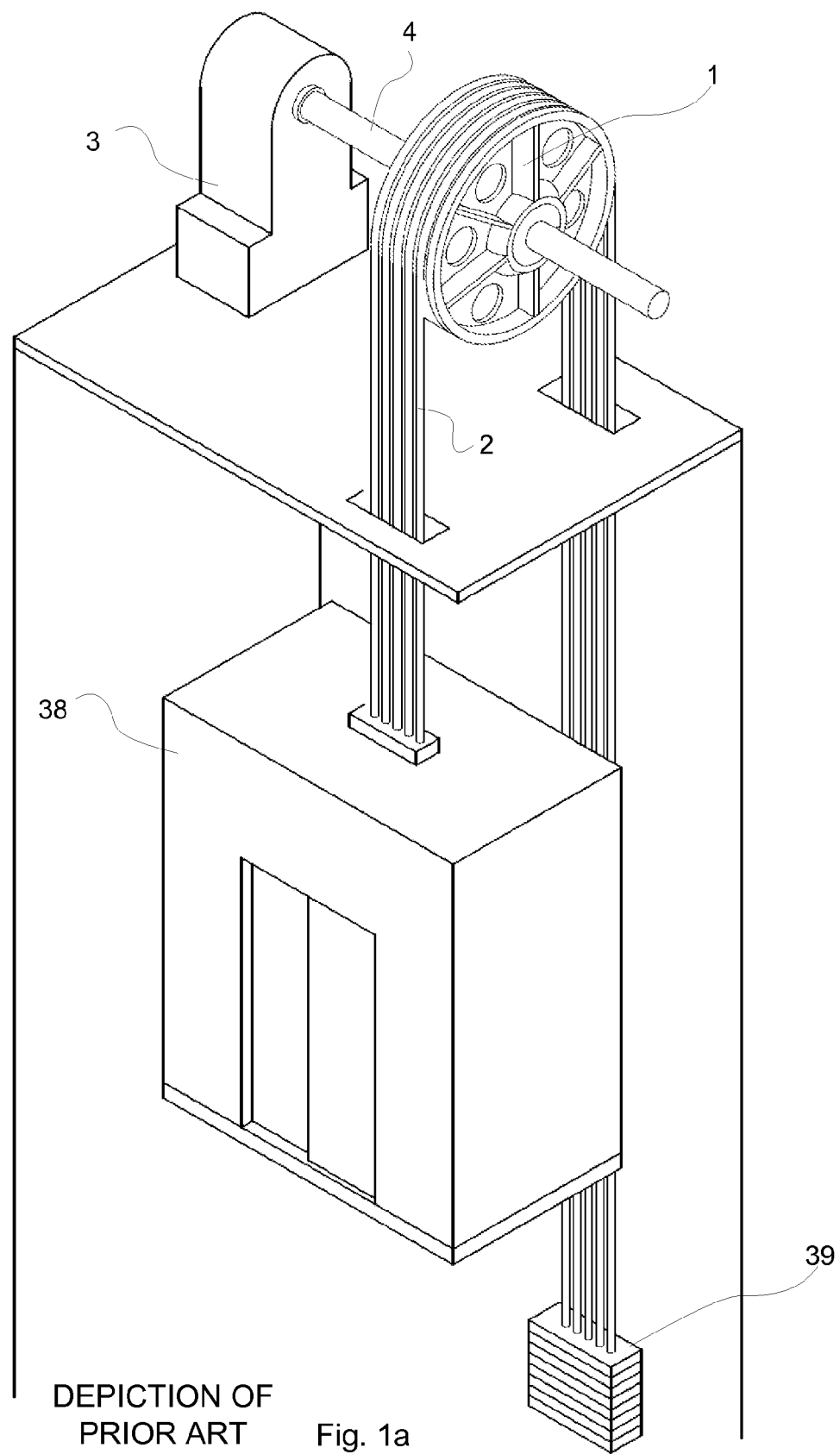
DEPICTION OF PRIOR ART    Fig. 1a

DEPICTION OF PRIOR ART

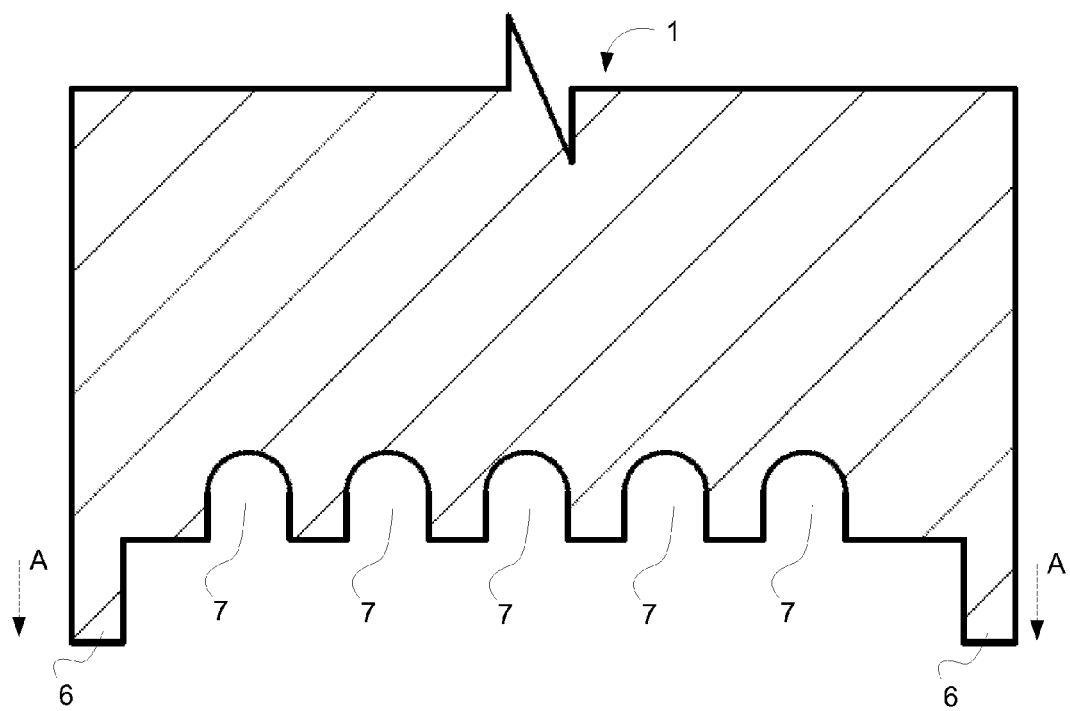
Fig. 1c
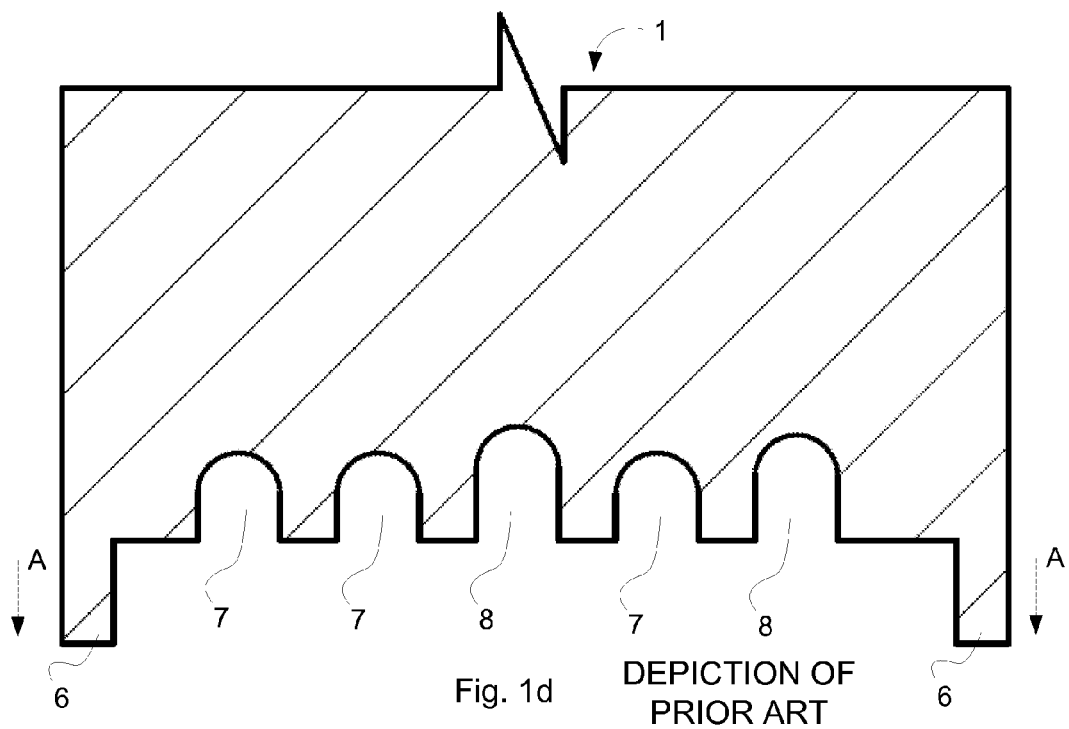
Fig. 1d  DEPICTION OF PRIOR ART

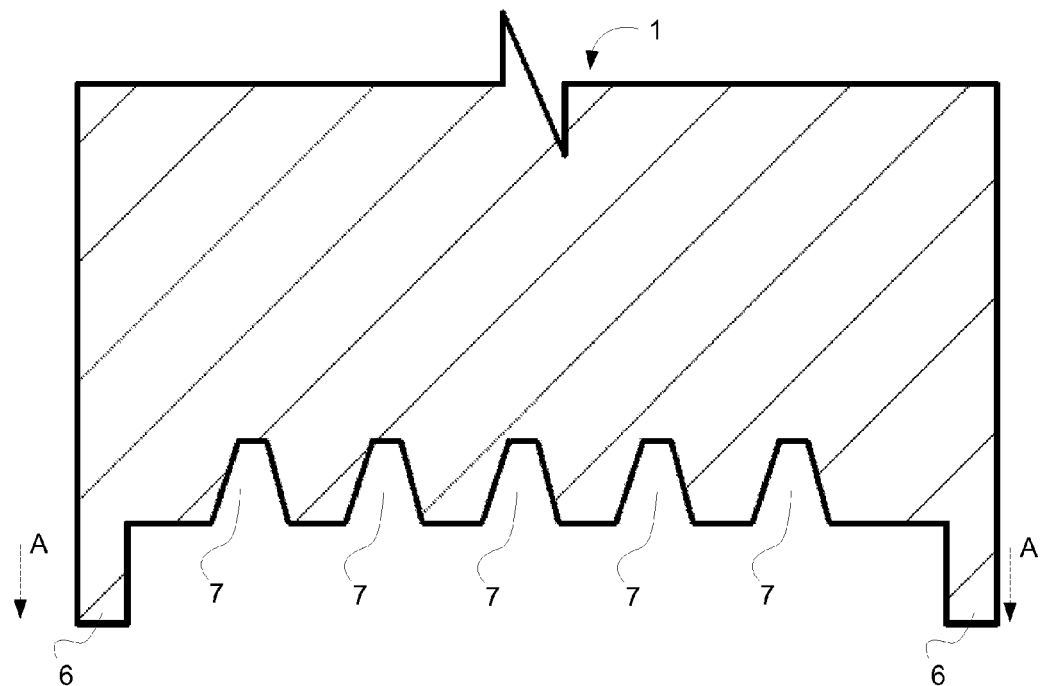
Fig. 1e
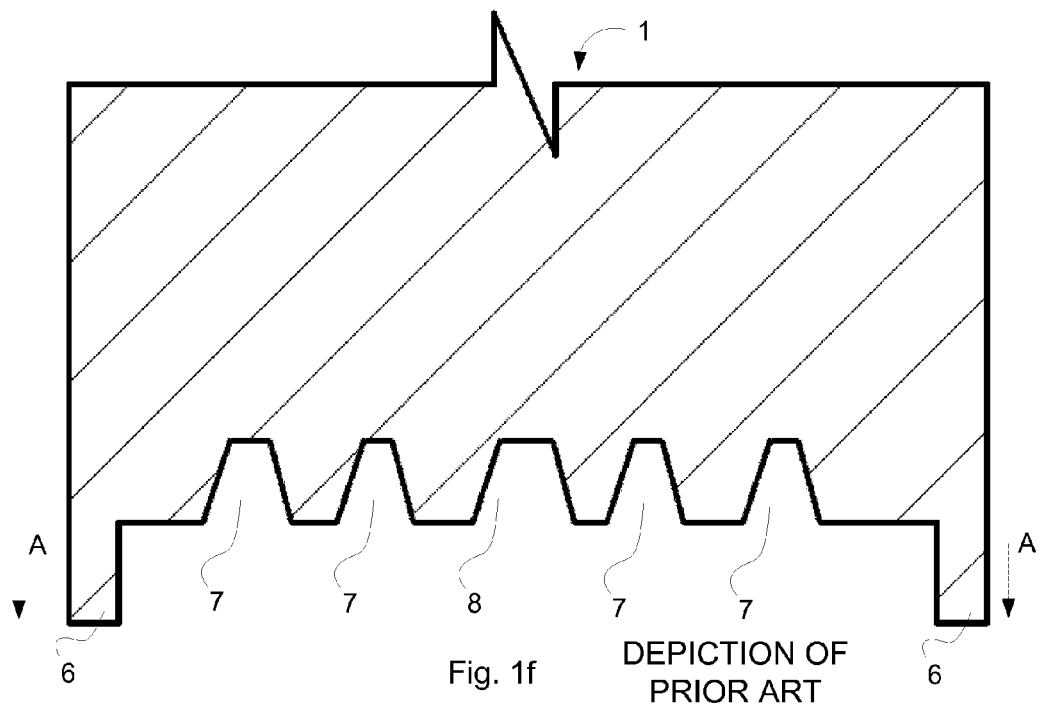
Fig. 1f   DEPICTION OF PRIOR ART

44 — DETERMINING, USING THE TEST KIT, WHETHER ONE OR MORE GROOVES OF A SHEAVE REQUIRE REGROOVING

Start

442 — INSERTING A MAGNETIC STANDARD IN EACH GROOVE ON THE UNDERSIDE OF THE SHEAVE NOT OBSTRUCTED BY A ROPE

444 — HOLDING A STRAIGHT-EDGE BAR ADJACENT TO THE MAGNETIC STANDARDS

446 — CONFIRMING WHICH OF THE SHEAVE GROOVES REQUIRE REGROOVING

End

Fig. 13

46 — REGROOVING, USING THE REGROOVE TOOL, ANY OF THE ONE OR MORE GROOVES OF THE SHEAVE THAT REQUIRE REGROOVING

Start

476 — POSITIONING THE TOOL ON THE STAND FOR REGROOVING AN ADDITIONAL GROOVE, COMPRISING SLIDING THE SHANK OF THE REGROOVE TOOL ON THE STAND TO A DIFFERENT ATTACHMENT POINT CORRESPONDING TO THE ADDITIONAL GROOVE, THE DIFFERENT ATTACHMENT POINT HAVING THE SAME REGROOVING DEPTH AS THE REGROOVING DEPTH OF THE FIRST GROOVE

478 — REPEATING THE REGROOVING STEPS UNTIL ALL GROOVES ARE REGROOVED

End

Fig. 15

SYSTEMS AND METHODS FOR MAINTAINING SHEAVE GROOVES

PRIORITY CLAIM

This invention claims the benefit of U.S. provisional patent application Ser. No. 61/444,686 filed Feb. 18, 2011 (our ref. WILS-1-1001) and U.S. provisional patent application Ser. No. 61/444,687 filed Feb. 18, 2011 (our ref. WILS-1-1002). The foregoing applications are incorporated by reference in their entirety as if fully set forth herein.

FIELD OF THE INVENTION

This invention relates generally to mechanics, and more specifically, to systems and methods for maintaining sheave grooves.

BACKGROUND

A sheave is a wheel or roller with one or more grooves along the circumference for holding a rope or cable (hereafter, rope will be used to refer to either a rope or a cable). When supported on its sides and equipped with a rope, a sheave becomes a pulley.

In some applications, the sheave has two or more grooves for holding two or more ropes. The sheave grooves grip the ropes, so when the sheave is rotated, the ropes and the load the ropes support move too.

Over time, as the load supported by the sheave is moved, rotating the rope through the sheave grooves, the sheave grooves wear. Particularly, if one of the sheave grooves begins to wear unevenly, the load maintained by the sheave grooves becomes uneven which may accelerate the wear of a particular sheave groove. Sheaves which are not used for support, such as deflector sheaves or other types of sheaves, may also wear unevenly.

Periodically, a sheave may be regrooved so that all grooves have an even depth of the groove, and uniform U-shape or V-shape (the two shapes in which sheave grooves are typically cut) across all the grooves. In some applications, it can be difficult to test for sheave groove wear, as the ropes or cables themselves may block access to the grooves. Yet such testing is required by sound maintenance practice, as well as in periodic inspections. Further, current regrooving techniques for sheaves are suboptimal.

Accordingly, this application discloses systems and methods for maintaining sheave grooves.

SUMMARY

This invention relates generally to mechanics, and more specifically, to systems and methods for maintaining sheave grooves.

In some embodiments, a sheave groove test kit may comprise two or more magnetic standards and a straight-edge bar. In some embodiments, a magnetic standard may be placed in each sheave groove on an underside of the sheave not in contact with ropes. In some embodiments, a straight-edge bar may be held adjacent to the magnetic standards, and any gap between the straight-edge bar and magnetic standards may indicate a worn sheave groove in need of regrooving.

In some embodiments, a tool for regrooving a sheave groove may include a body, a body clamp, a shank, and a cutting insert. In some embodiments, a tool for regrooving a sheave groove may be received by a stand that is known in the art for receiving a device configured for maintaining a sheave groove. In some embodiments, a tool for regrooving a sheave groove has a cylindrical cutting insert, and the tool further has a cutter backing of the body designed to prevent deflection of the cylindrical cutting insert during regrooving operations. In some embodiments, a sheave groove may be maintained by holding a sheave groove tool against a sheave groove to be maintained, operating the driver of the sheave to rotate the sheave, allowing the cutting insert in contact with the sheave groove to grind the sheave groove to a uniform condition.

In some embodiments, a method for maintaining sheave grooves may include providing a sheave groove test kit, providing a regroove tool, determining, using the test kit, whether one or more grooves of a sheave require regrooving, and regrooving, using the regroove tool, and of the one or more grooves of the sheave that require regrooving.

BRIEF DESCRIPTION OF THE DRAWINGS

Embodiments of the present invention are described in detail below with reference to the following drawings:

FIGS. 1a, 1b, 1c, 1d, 1e and 1f are depictions of the prior art;

FIG. 13 is a flow diagram of a method for maintaining sheave grooves, in accordance with an embodiment of the invention;

FIG. 15 is a flow diagram of a method for maintaining sheave grooves, in accordance with an embodiment of the invention.

DETAILED DESCRIPTION

This invention relates generally to elevators, and more specifically, to an elevator life safety gate. Specific details of certain embodiments of the invention are set forth in the following description and FIGS. 1-15 to provide a thorough understanding of such embodiments. The present invention may have additional embodiments, may be practiced without one or more of the details described for any particular described embodiment, or may have any detail described for one particular embodiment practiced with any other detail described for another embodiment.

FIG. 1a is a depiction of the prior art. In an exemplary environment, a sheave may be used in the application of an elevator. It should be understood that an elevator is used herein strictly as an example, and the teachings of the instant disclosure apply to sheaves used in any application, such as with an inclinator, a pulley, a rigging, an automobile or a lawn mower. Further, within the application of an elevator, a sheave may be a main drive sheave, or may be a deflector sheave, or any other type of sheave.

Figure 1B:
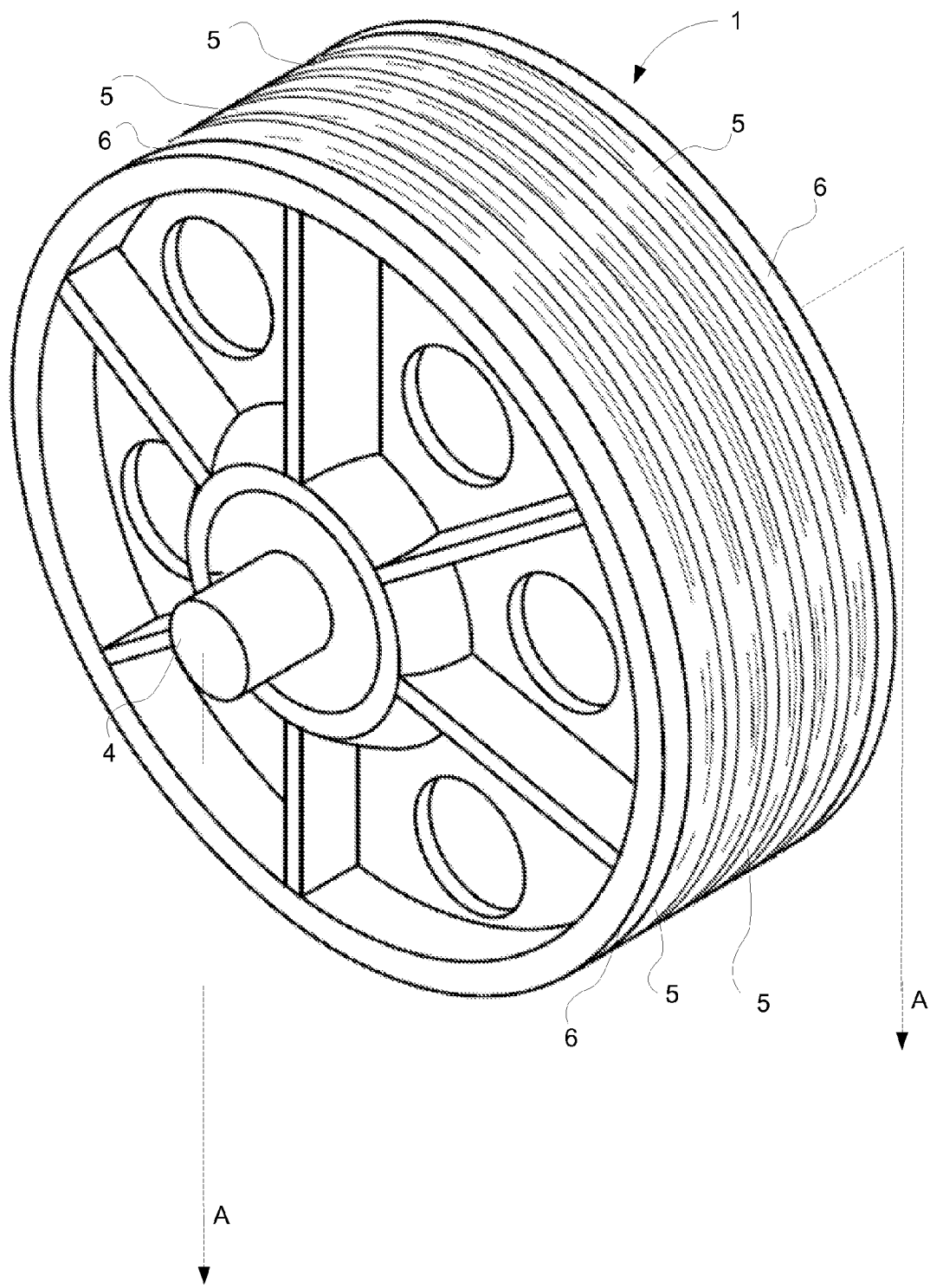

In the exemplary environment depicted in FIG. 1a, a sheave 1 is shown at the top of an elevator shaft. Ropes 2 are looped over the top of the sheave 1 and are gripped by sheave grooves (sheave grooves not visible in FIG. 1a but seen in FIG. 1b). The ropes 2 have a load at either end, in this case an elevator car 38 and a counterweight 39. The sheave 1 is supported in part by a shaft 4, the shaft 4 being connected to a motor 3 which when operated rotates the sheave 1, thus moving the load up and down. In this case, the motor 3 drives (rotates) the sheave 1 which either moves the elevator car 38 up and the counterweight 39 down, or vice-versa. The motor 3 is a "driver" of the sheave 1.

FIG. 1b is a depiction of the prior art. A sheave 1 has one or more sheave grooves 5 along the circumference of the sheave 1. (In FIG. 1b, a sheave 1 with five sheave grooves 5 is shown.) The edges of the circumference of the sheave 1 are lips 6 of the sheave 1, one lip 6 on either side of the one or more sheave grooves 5. Protruding through the center of the sides of the sheave 1 is the shaft 4. In FIG. 1b, the sheave 1 has a cross-section A-A depicted, which cuts through the sheave from the shaft 4 and slices downward to the bottom edge of the sheave 1. This cross section will be discussed in more detail with respect to FIGS. 1c-1f.

FIGS. 1c-1f are depictions of the prior art. In FIG. 1c, a portion of the cross-section A-A is shown. Particularly, a bottom edge of the cross-section depicting the sheave grooves and the lip of the sheave 1 are shown. FIG. 1c depicts a sheave in which the sheave grooves 7 in between the lips 6 of the sheave have no wear. Sheave grooves 7 are U-groove style sheave grooves, and have a uniform shape and depth. Such a sheave 1 would not need regrooving.

In FIG. 1d, a portion of the cross-section A-A of a sheave 1 is shown, also having lips 6 and sheave grooves 7 & 8 between the lips 6. In this example, using U-grooves, two of the grooves 8 are exhibiting signs of uneven wear while three grooves 7 show no wear. The three unworn grooves 7 maintain their uniform shape and depth, but the two worn grooves 8 are deeper than the unworn grooves 7. In more extreme cases of wear, the worn grooves may be misshapen, having lost their U-groove appearance, or may be wider than unworn grooves. FIG. 1d depicts sheave grooves that may be regrooved to return the plurality of grooves to a uniform condition.

In FIG. 1e, a portion of the cross-section A-A of a sheave 1 using V-grooves is shown. (Some sheaves use V-grooves instead of U-grooves, the description U-groove or V-groove owing to the shape of the groove.) FIG. 1e shows five V-grooves 7 that have a uniform shape and depth. The five V-grooves 7 in FIG. 1e are unworn grooves. This 155 sheave 1 does not need regrooving.

In FIG. 1f, a portion of the cross-section A-A of a sheave 1 using V-grooves is shown, this cross-section having at least one worn V-groove 8, where it can be seen that the V-groove is not uniform relative to the unworn V-grooves 7. FIG. 1f depicts sheave grooves that may be regrooved to return the plurality of grooves to a uniform condition.

Figure 2:
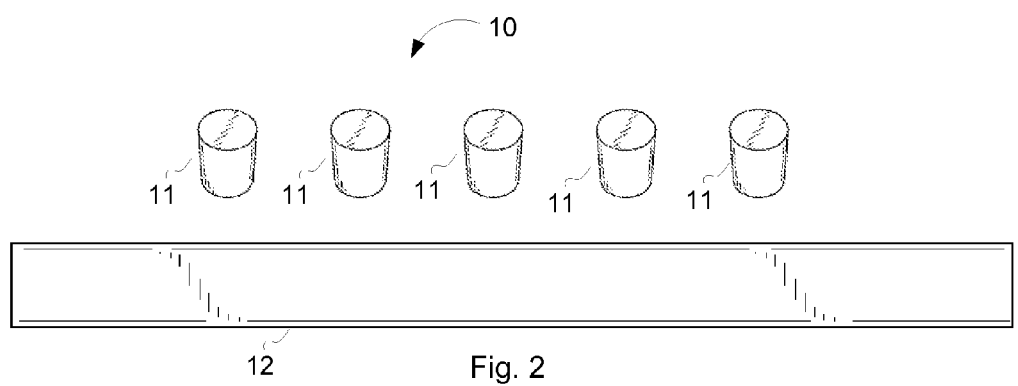
FIG. 2 is a perspective view of a sheave groove test kit, in accordance with an embodiment of the invention.

FIG. 2 is a perspective view of a sheave groove test kit, in accordance with an embodiment of the invention. In some embodiments, a sheave groove test kit 10 may have two or more magnetic standards 11, the magnetic standards 11 being a plurality of cylinders of uniform shape and size that are magnetic. In some embodiments, the cylindrical magnetic standards have a diameter of ½". In different embodiments, the cylindrical magnetic standards have a diameter of ⅝". The measurements ½" and ⅝" correspond with two common groove sizes for the exemplary elevator sheave grooves. In other embodiments, the cylindrical magnetic standards have other diameters sized appropriately for the sheave being tested. A cylindrical magnetic standard may be as small as 0.01" in diameter or may be as large as 48" in diameter. In some embodiments, a cylindrical magnetic standard is not magnetic. In different embodiments, the magnetic standards are not cylindrical. In some embodiments, the magnetic standards are v-shaped.

In some embodiments, a sheave groove test kit 10 may include one or more straight-edge bars 12. In some embodiments, a sheave groove test kit 10 may include a straight-edge bar 12 sized to fit inside and in between the lips of a sheave. In some embodiments, a sheave groove test kit 10 may include a straight-edge bar 12 sized to rest on top of the lips of a sheave, or merely to rest on top of the magnetic standards in the case of a sheave without lips on the edge of the circumference of the sheave.

Figure 3:
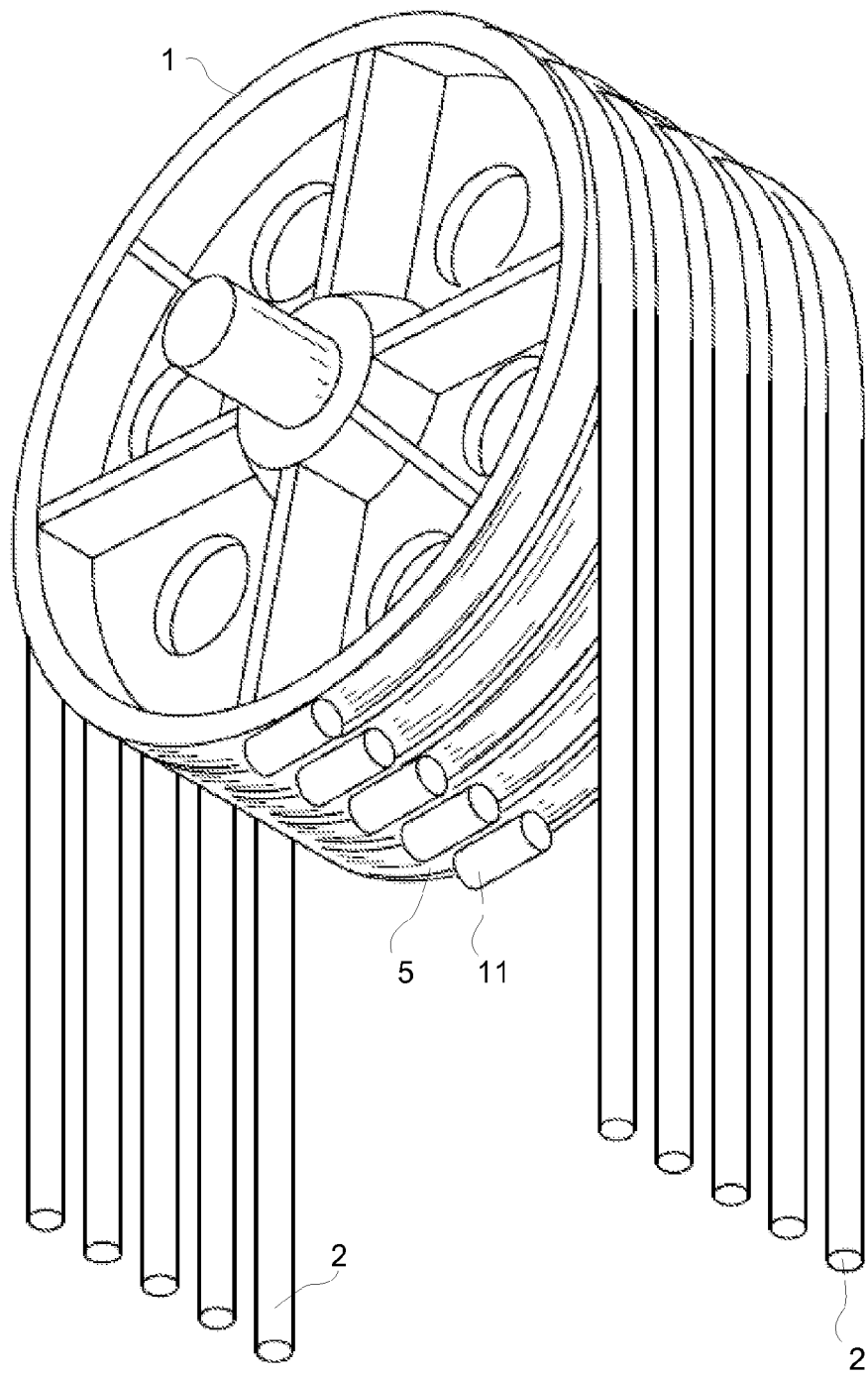
FIG. 3 is a perspective view of a sheave groove test kit, in accordance with an embodiment of the invention.

FIG. 3 is a perspective view of a sheave groove test kit, in accordance with an embodiment of the invention. To test for worn sheave grooves of a particular sheave 1, a magnetic cylinder 11 may be placed in each sheave groove 5 of the sheave. The magnetic standards 11 adhere to the sheave grooves 5 of the sheave. The magnetic standards 11 may be placed on the underside of the sheave 1 in areas of the grooves 5 that are not in contact with the ropes 2, and the magnetic quality of the magnetic standards 11 will hold the standards 11 in place and prevent the standards 11 from falling out of the grooves 5. This is advantageous because the 185 ropes 2 do not have to be disengaged from the sheave 1 to provide access to the grooves 5 for testing or inspection.

Figure 4A:
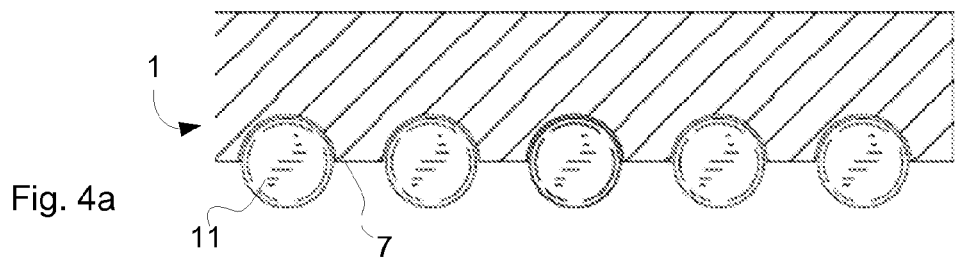
FIGS. 4a and 4b are front views of a sheave groove test kit, in accordance with an embodiment of the invention.
Figure 4B:
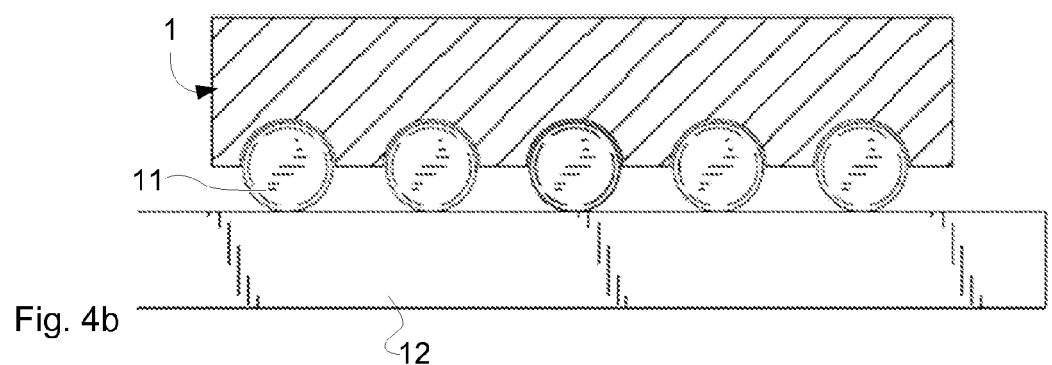

FIGS. 4a and 4b are front views of a sheave groove test kit, in accordance with an embodiment of the invention. FIG. 4a shows a cross-section of a sheave 1, with unworn U-grooves 7. Magnetic standards 11 have been inserted in each of the unworn U-grooves 7. FIG. 4b shows holding a straight-edge bar 12 adjacent to the magnetic standards 11. In this example, the straight-edge bar 12 is touching each of the magnetic standards 11, revealing through a visual confirmation that the U-grooves 7 are uniform and that sheave regrooving is not required.

Figure 5A:
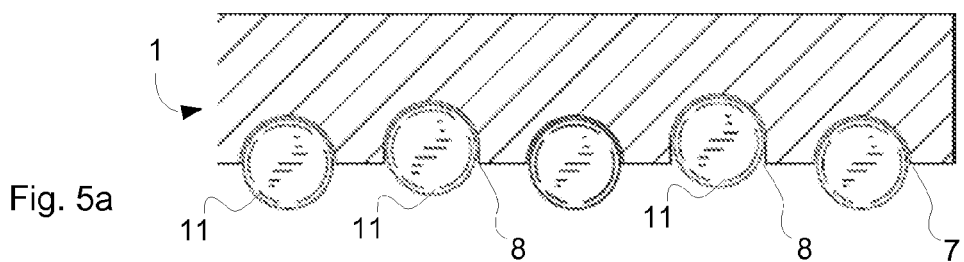
FIGS. 5a and 5b are front views of a sheave groove test kit, in accordance with an embodiment of the invention.
Figure 5B:
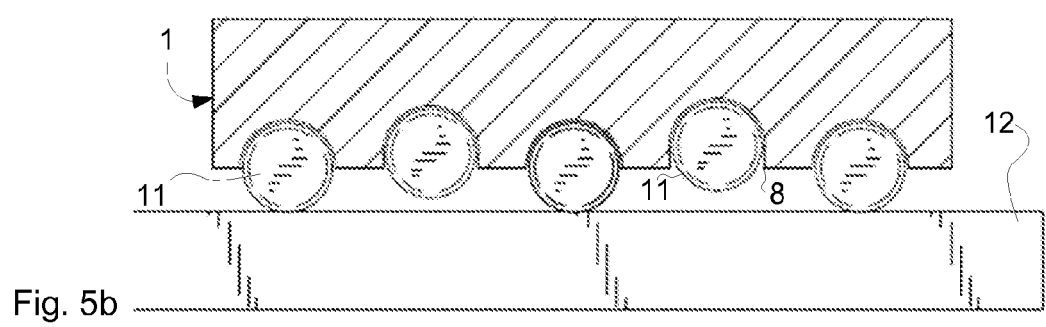

FIGS. 5a and 5b are front views of a sheave groove test kit, in accordance with an embodiment of the invention. FIG. 5a shows a cross-section of a sheave 1, but with both unworn U-grooves 7 and worn U-grooves 8. Magnetic standards 11 have been inserted in each of the grooves. FIG. 5b shows holding a straight-edge bar 12 adjacent to the magnetic standards 11. In this example, the straight-edge bar 12 is not touching each of the magnetic standards 11. There is a gap between the straight-edge bar 12 and the magnetic standards inserted in the worn U-grooves 8, revealing through a visual confirmation that the U-grooves are non-uniform and that sheave regrooving is required.

In some instances, it may be that the wear of the grooves of the sheave has occurred evenly from right to left (or from left to right), in that the depths of the grooves are non-uniform but that the rate of change of the groove depths from one direction to the other is constant. In an example of a sheave with five grooves, the left-most groove could be unworn, the next groove to the right could be 0.1" deeper, the next groove to the right could be 0.2" deeper, the next groove to the right could be 0.3" deeper, with the last groove being 0.4" deeper. In this instance the straight-edge bar would still contact all the magnetic standards inserted into the grooves. However, it would be visually apparent in this instance that the straight-edge bar was not level relative to the lips of the sheave, and thus even in this rare case where the sheave groove wear is itself uniform the test kit will still reveal sheave grooves needing regrooving.

Figure 6A:
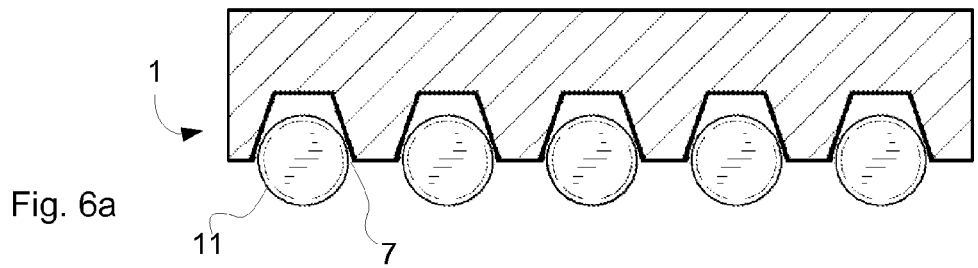
FIGS. 6a and 6b are front views of a sheave groove test kit, in accordance with an embodiment of the invention.
Figure 6B:
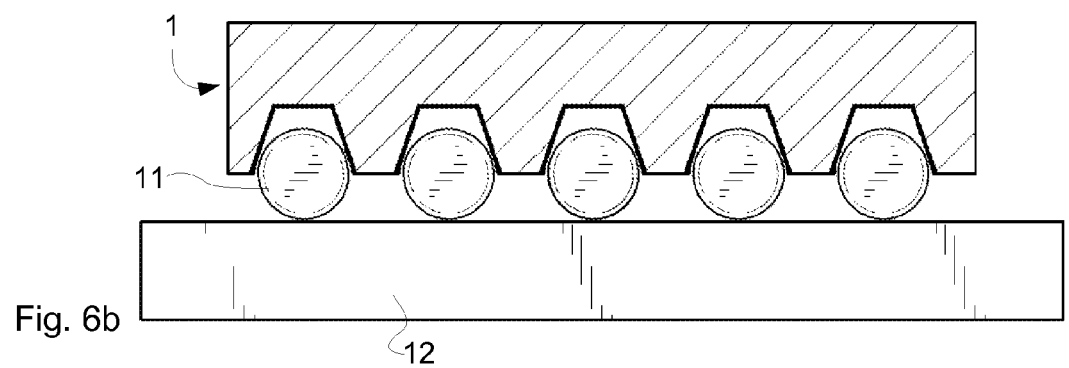

FIGS. 6a and 6b are front views of a sheave groove test kit, in accordance with an embodiment of the invention. FIG. 6a shows a cross-section of a sheave 1, with unworn V-grooves 7. Magnetic standards 11 have been inserted in each of the unworn V-grooves 7. FIG. 6b shows holding a straight-edge bar 12 adjacent to the magnetic standards 11. In this example, the straight-edge bar 12 is touching each of the magnetic standards 11, revealing through a visual confirmation that the V-grooves 7 are uniform and that sheave regrooving is not required.

Figure 7A:
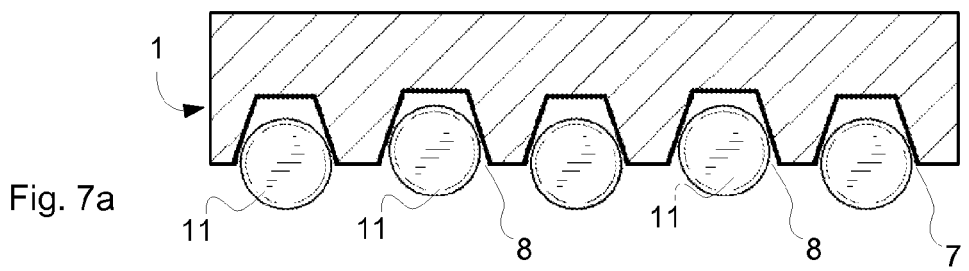
FIGS. 7a and 7b are front views of a sheave groove test kit, in accordance with an embodiment of the invention.
Figure 7B:
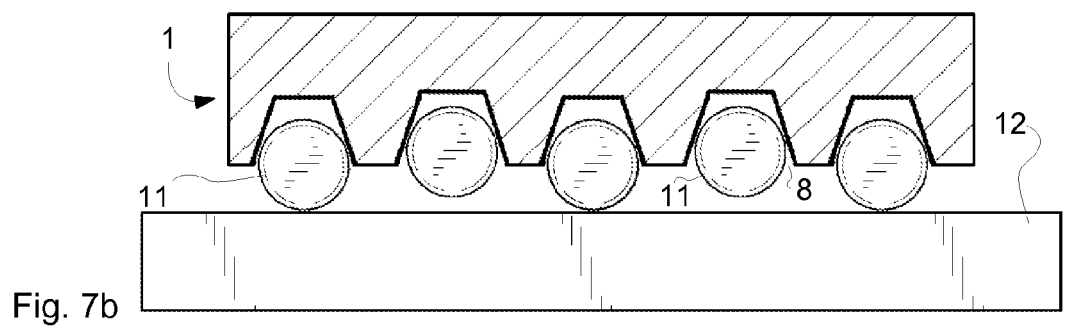

FIGS. 7a and 7b are front views of a sheave groove test kit, in accordance with an embodiment of the invention. FIG. 7a shows a cross-section of a sheave 1, but with both unworn V-grooves 7 and worn V-grooves 8. Magnetic standards 11 have been inserted in each of the grooves. FIG. 7b shows holding a straight-edge bar 12 adjacent to the magnetic standards 11. In this example, the straight-edge bar 12 is not touching each of the magnetic standards 11. There is a gap between the straight-edge bar 12 and the magnetic standards inserted in the worn U-grooves 8, revealing through a visual confirmation that the U-grooves are non-uniform and that sheave regrooving is required.

Figure 8A:
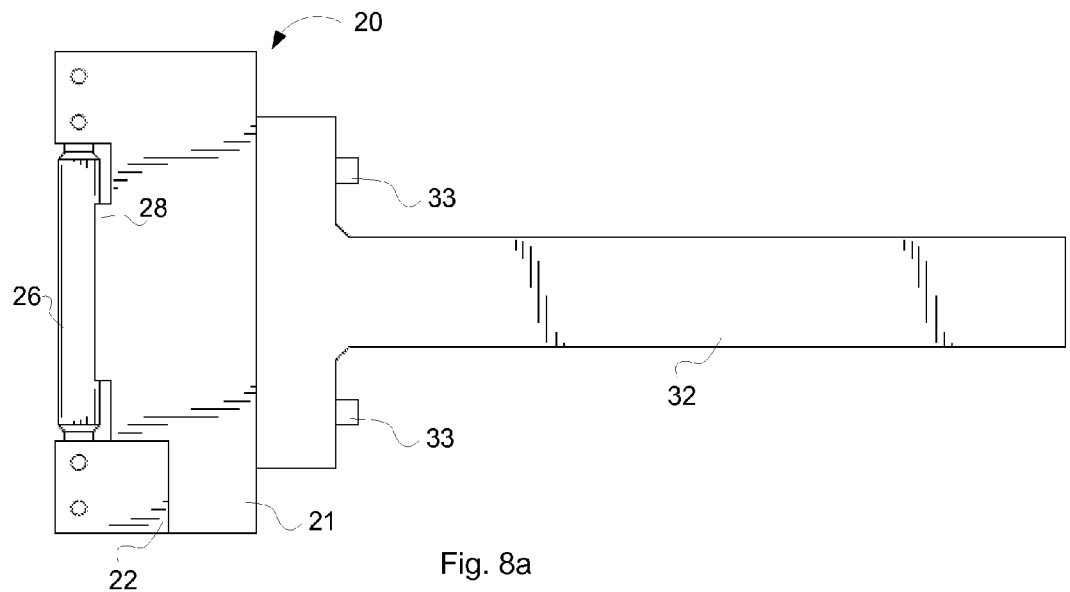
FIGS. 8a and 8b are a top view and a perspective view of a sheave groove regroove tool, in accordance with an embodiment of the invention.
Figure 8B:
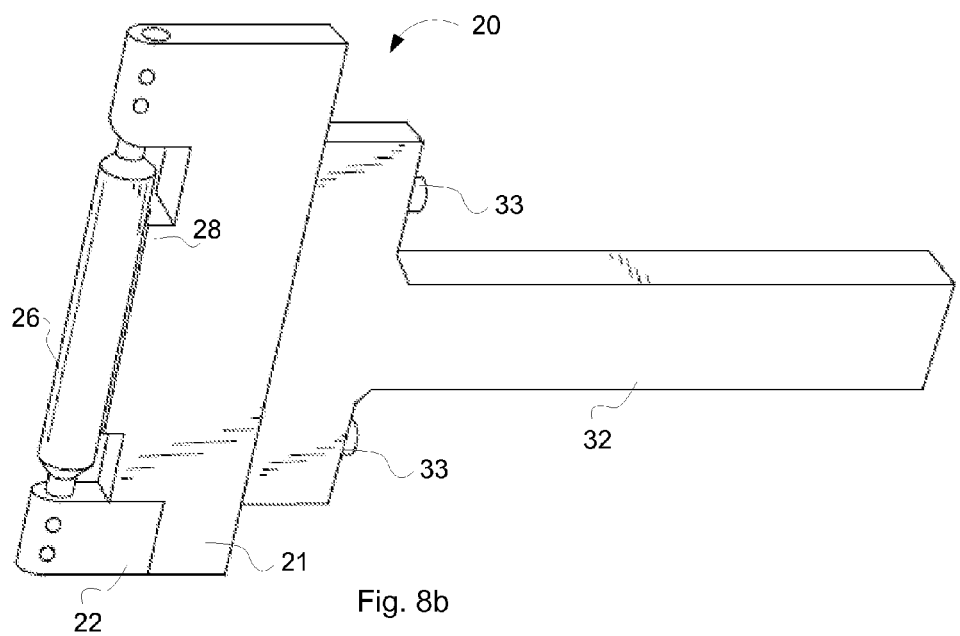

FIGS. 8a and 8b are a top view and a perspective view of a sheave groove regroove tool, in accordance with an embodiment of the invention. In some embodiments, a sheave groove regroove tool 20 has a body 21 and a shank 32. The body 21 and shank 32 may be separated and are coupled using shank threaded fasteners 33 (which will be discussed in further detail relative to FIGS. 10a and 10b). The body 21 has a cutting insert 26, the cutting insert 26 being held in place in the body 21 with a body clamp 22. A cutter backing 28 of the body 21 prevents deflection of the cutting insert 26 during regrooving operations.

Figure 9A:
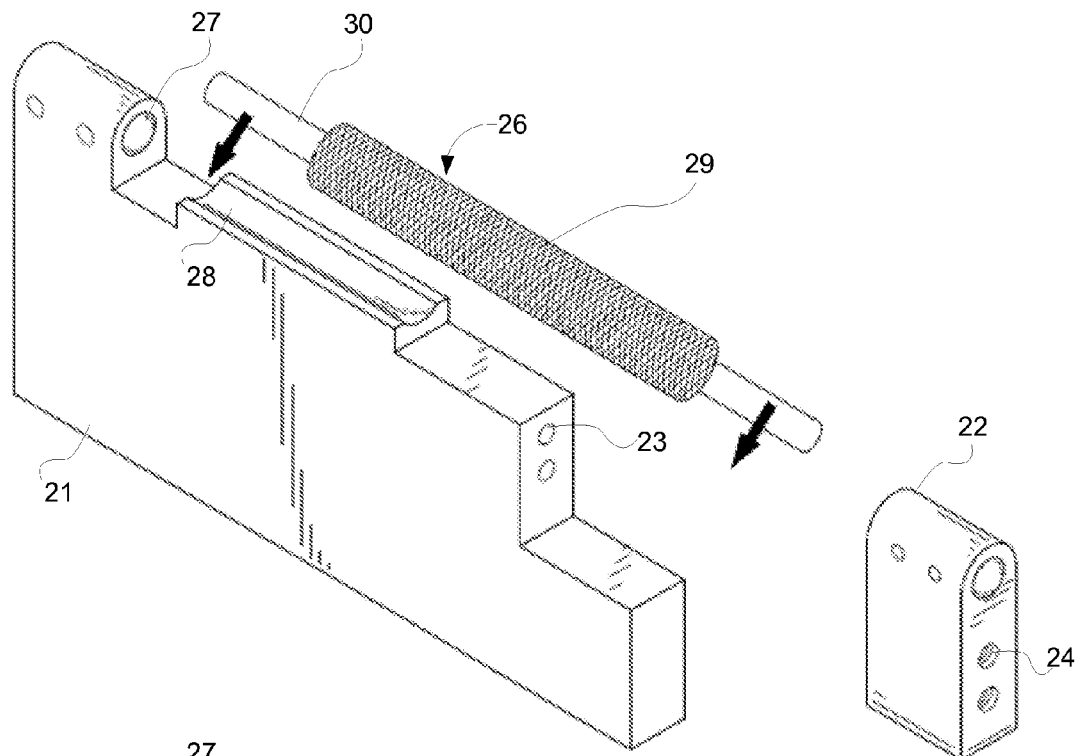
FIGS. 9a, 9b and 9c are perspective views of a sheave groove regroove tool, in accordance with an embodiment of the invention.
Figure 9B:
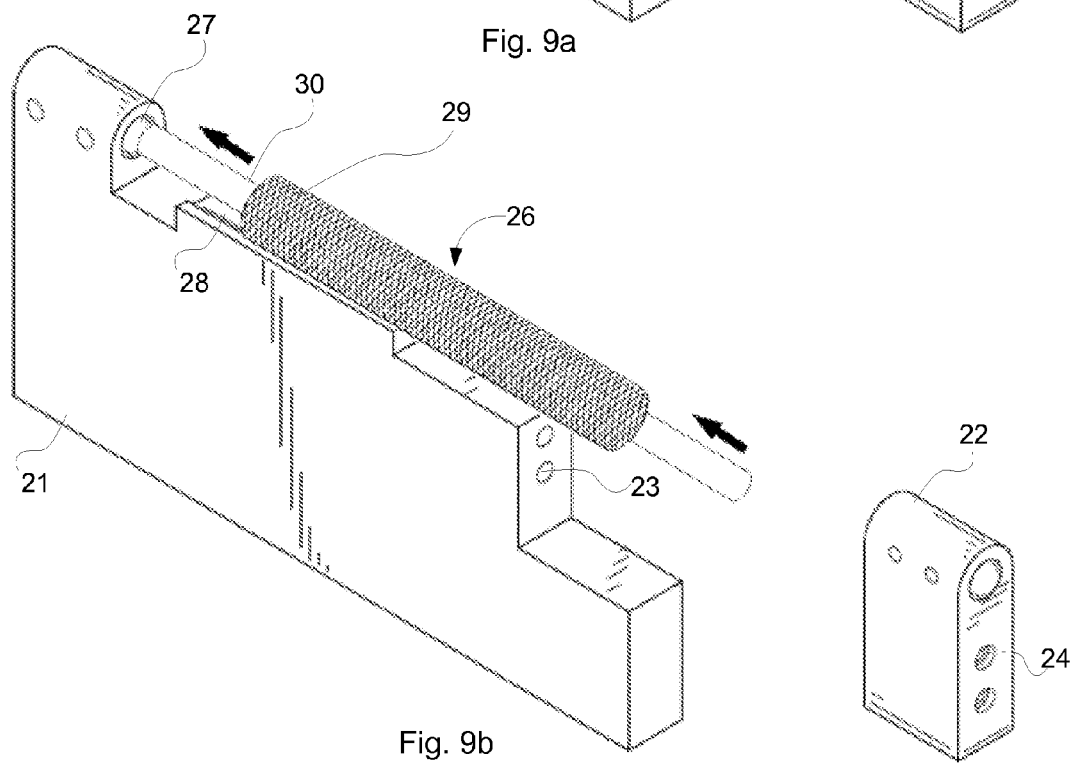
Figure 9C:
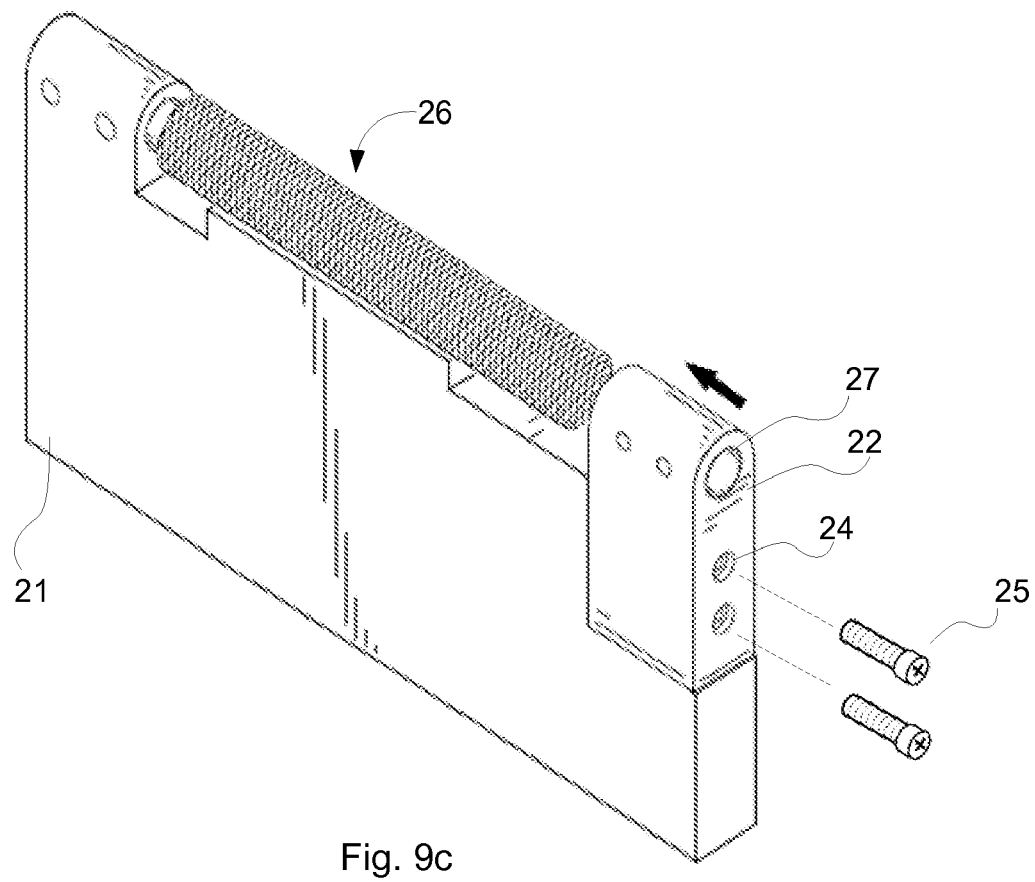

FIGS. 9a, 9b and 9c are perspective views of a sheave groove regroove tool, in accordance with an embodiment of the invention. In some embodiments, a cutting insert 26 may be generally cylindrical, with a cutting insert shaft portion 30 and a portion having staggered cutting teeth 29. The teeth 29 come into contact with a U-groove and the generally cylindrical configuration of the cutting insert 26 grinds a new and uniform surface of a U-groove of a sheave. In different embodiments, a cutting insert 26 may have a portion between the ends of the shaft that is V-shaped or triangular instead of cylindrical, the V-shaped or triangular portion configured to grind a new and uniform surface of a V-groove of a sheave.

In some embodiments, a body 21 of the tool 20 has a cutter backing 28. The cutter backing 28 is configured for preventing deflection of the cutting insert 26 as the tool 20 is inserted into a sheave groove. As can be seen more clearly in FIGS. 11a and 11b, a sheave groove regroove tool 20 is inserted into and held against a sheave groove 5. The sheave driver is operated, rotating the sheave 1 about the shaft 4, and the cutting insert 26 of the tool grinds the groove back to a uniform condition. The cutter backing 28 resists any deflection from the cutting insert 26 resulting from the tool 20 being held against the sheave 1.

Returning to FIGS. 9a, 9b and 9c, an appropriately sized and configured cutting insert 26 may be chosen for use with the tool 20 by installing the correct insert into the body 21. A cutting insert 26 may be sized to cut a ½" groove, or a ⅝" groove, for example. Other sizes of cutting inserts ranging from 0.01" to 48" are possible. The body 21 has a cutting insert channel 27 configured for receiving a portion of the cutting insert shaft 30. Once the cutting insert shaft 30 of the cutting insert 26 slides into the cutting insert channel 27, the body clamp 22 can be coupled with the body 21. The body clamp 22 also has a cutting insert channel 27 configured for receiving a portion of the cutting insert shaft 30. The body 21 has threaded apertures 23 configured for receiving threaded fasteners 25. The body clamp 22 has counter-bored apertures 24 configured for receiving the threaded fasteners 25. The body clamp 22, having received a portion of the cutting insert shaft 30, is placed into position adjacent to the body 21, and threaded fasteners 25 are inserted into the counter-bored apertures 24 and threaded into the threaded apertures 23 and tightened. Removal of the cutting insert 26 to replace it with a different insert is a reverse of the foregoing-described operation. Alternatively, the threaded fasteners 25 may be loosened permitting rotation of the cutting insert 26, to present a fresh surface of the cutting insert to the sheave during regrooving operations, as the regrooving may wear away the teeth of the cutting insert.

Advantageously, the cutting insert 26 is supported by at least two mount points of the body 21, and at least one mount point of the body is on either side of a longitudinal axis through the shank. In some embodiments, one mount point is where the cutting insert 26 is inserted into the body 21 at the cutting insert channel 27 of the body 21, and the other mount point is where the cutting insert 26 is inserted into the body clamp 22 at the cutting insert channel 27 of the body clamp 22. When the tool 20 is used to grind a sheave groove, the cutting insert is supported both above and below the point at which the cutting insert 26 comes into contact with the sheave groove, reducing chatter during the grooving operation and providing a clean groove.

Figure 10A:
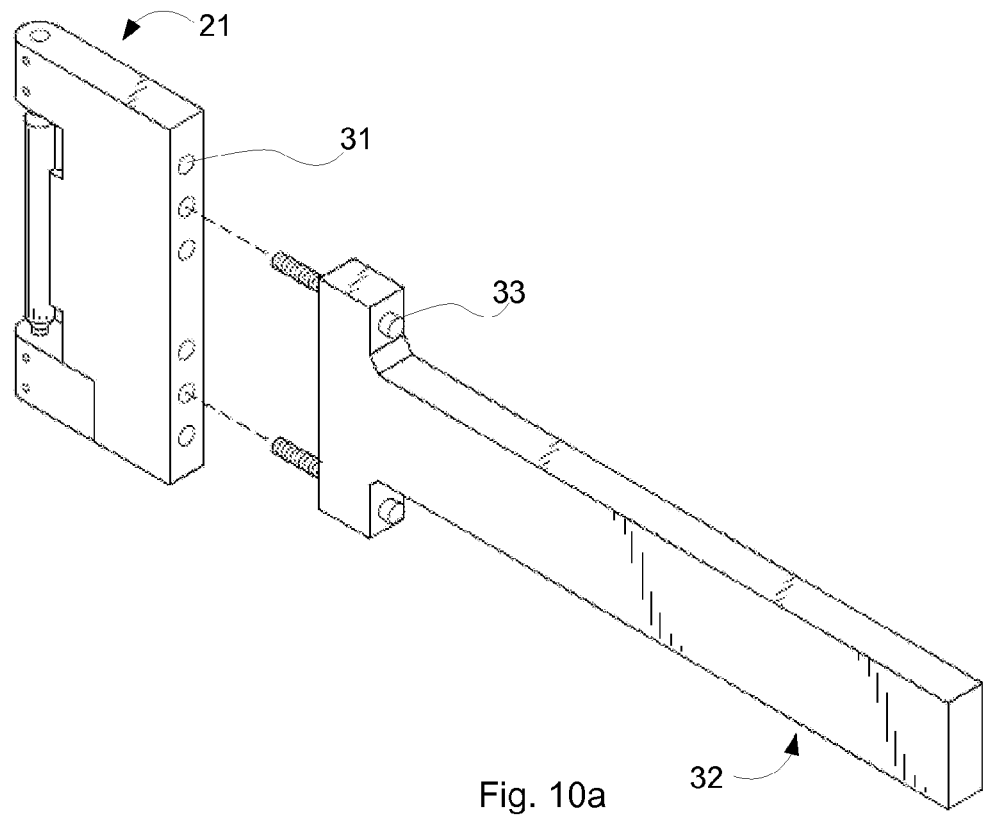
FIGS. 10a and 10b are perspective views of a sheave groove regroove tool, in accordance with an embodiment of the invention.
Figure 10B:
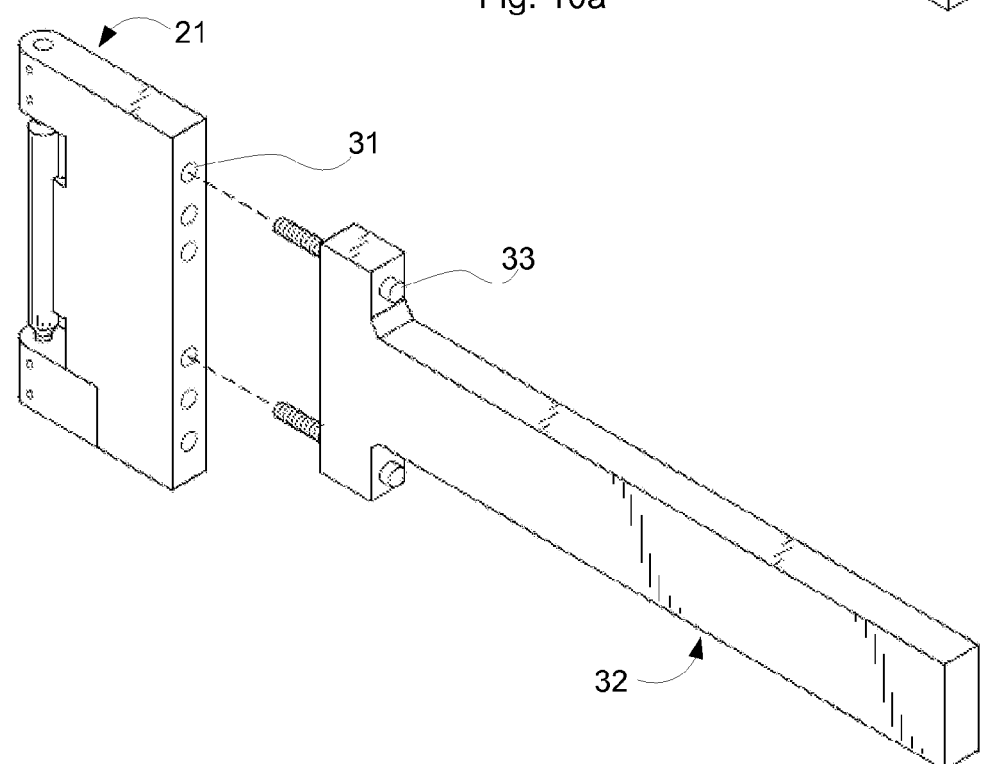

FIGS. 10a and 10b are perspective views of a sheave groove regroove tool, in accordance with an embodiment of the invention. A body 21 of a sheave groove regroove tool 20 may have a plurality of body shank threaded apertures 31. The body shank threaded apertures 31 may be divided into two groups of apertures, wherein one threaded aperture from each of the two groups is used for coupling the shank 32 using the threaded fasteners of the shank 33. In FIG. 10a, it may be seen that the threaded fasteners of the shank 33 are inserted into the middle apertures of the two groups of body shank threaded apertures 31. In FIG. 10b, it may be seen that the threaded fasteners of the shank 33 are inserted into the top apertures of the two groups of body shank threaded apertures 31. In this manner, the body 21 can be moved up and down relative to the shank 32, presenting a fresh surface of the cutting insert to the sheave during regrooving operations, as the regrooving may wear away the teeth of the cutting insert.

Figure 11A:
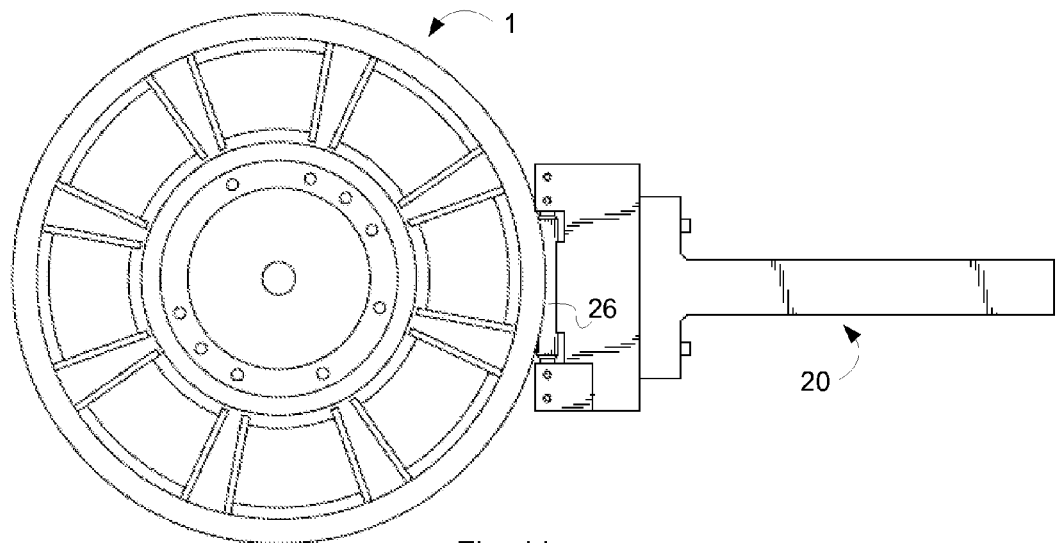
FIGS. 11a and 11b are a front view and a perspective view of a sheave groove regroove tool, in accordance with an embodiment of the invention.
Figure 11B:
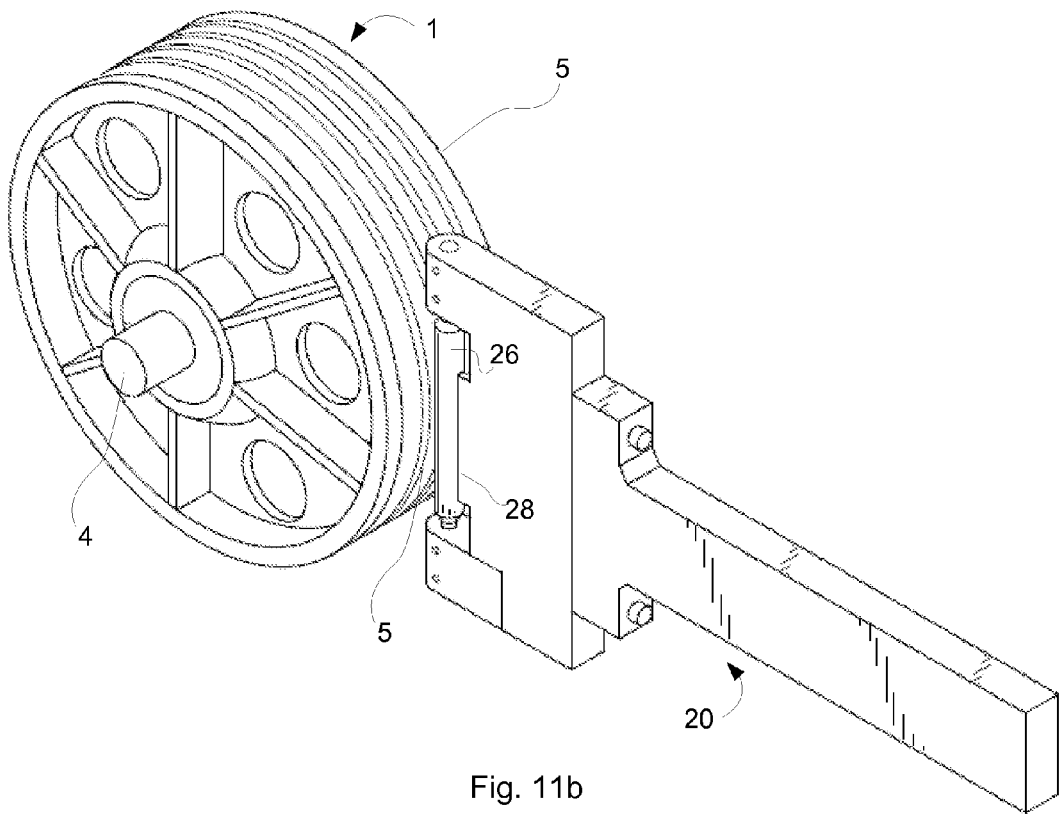

FIGS. 11a and 11b are a front view and a perspective view of a sheave groove regroove tool, in accordance with an embodiment of the invention. To regroove a particular groove 5 of a sheave 1, a sheave groove regroove tool 20 may be inserted into and held against a sheave groove 5. The sheave driver is operated, rotating the sheave 1 about the shaft 4, and the cutting insert 26 of the tool 20 grinds the groove 5 back to a uniform condition.

In some embodiments, a tool 20 will be coupled with a stand configured for receiving a regrooving device. Such stands are known in the art. A stand is set up in front of the sheave to be regrooved, with the front edge of the stand parallel to a line between the lips of the sheave. The stand receives the regrooving device and permits the device to slide from stations between one side of the stand to the other side, with stations corresponding to the grooves of the sheave, and permits the device to be coupled with the sheave at a constant distance from the sheave resulting in a constant depth groove being cut into the sheave.

Figure 12:
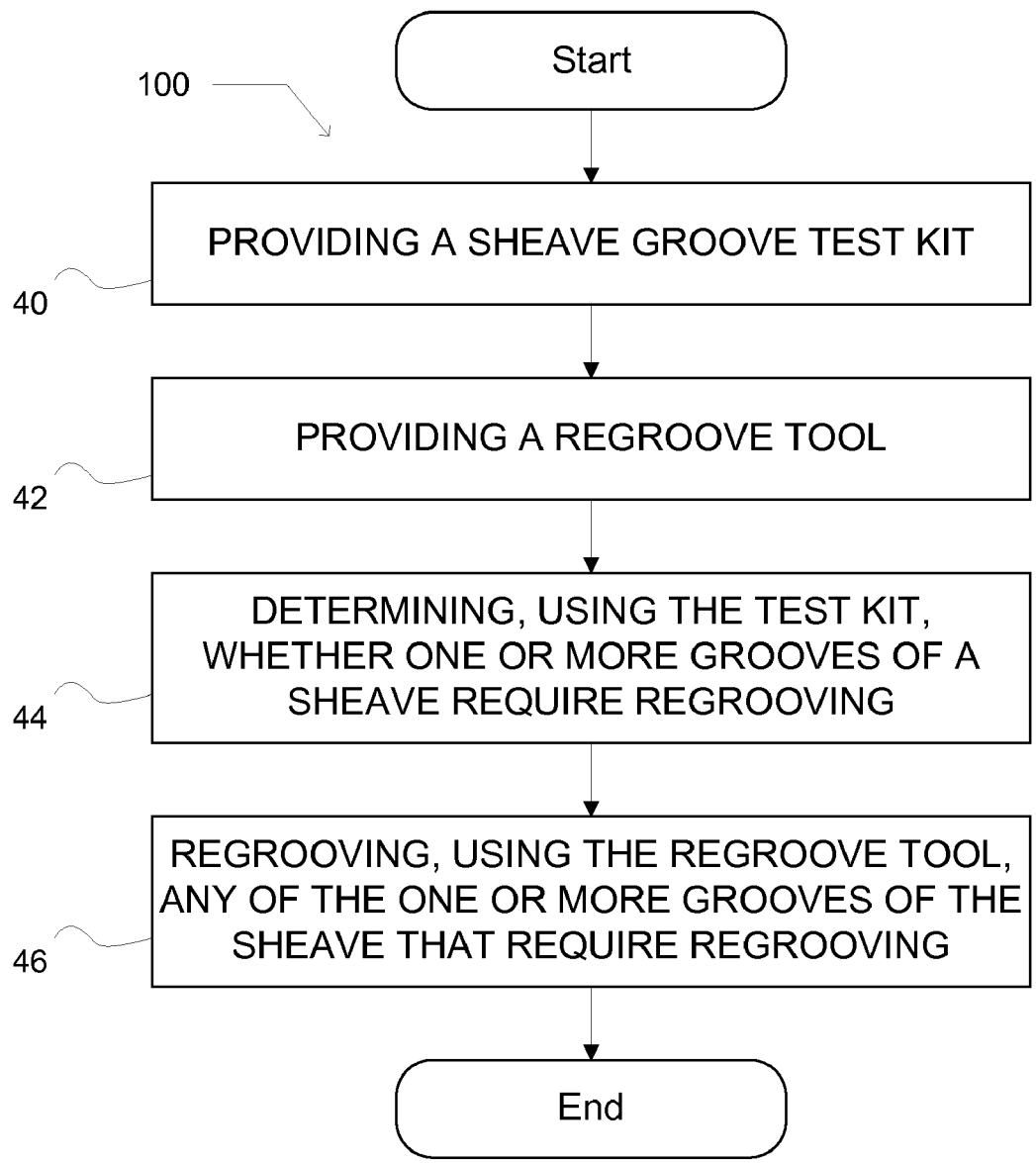
FIG. 12 is a flow diagram of a method for maintaining sheave grooves, in accordance with an embodiment of the invention.

FIG. 12 is a flow diagram for a method of maintaining sheave grooves, in accordance with an embodiment of the invention. In some embodiments, exemplary operational flow 100 can be used to maintain sheave grooves. After a start operation, the operational flow includes a step of providing a sheave groove test kit 40, providing a regroove tool 42, determining, using the test kit, whether one or more grooves of a sheave require regrooving 44, and regrooving, using the regroove tool, and of the one or more grooves of the sheave that require regrooving 46. Operation of the embodiment may be illustrated with reference to the test kit of FIGS. 2 through 7b, the regroove tool of FIGS. 8a through 10b, and the regrooving operation of FIGS. 11a and 11b.

FIG. 13 is a flow diagram for a method of maintaining sheave grooves, in accordance with an embodiment of the invention. In some embodiments, the determining, using the test kit, whether one or more grooves of a sheave require regrooving step 44 may include at least one additional operation. The at least one additional operation may include an operation 442 and/or an operation 444 and/or an operation 446. The operation 442 includes inserting a magnetic standard in each groove on the underside of the sheave not obstructed by a rope. The operation 444 includes holding a straight-edge bar adjacent to the magnetic standards. The operation 446 includes confirming which of the sheave grooves require regrooving.

Figure 14:
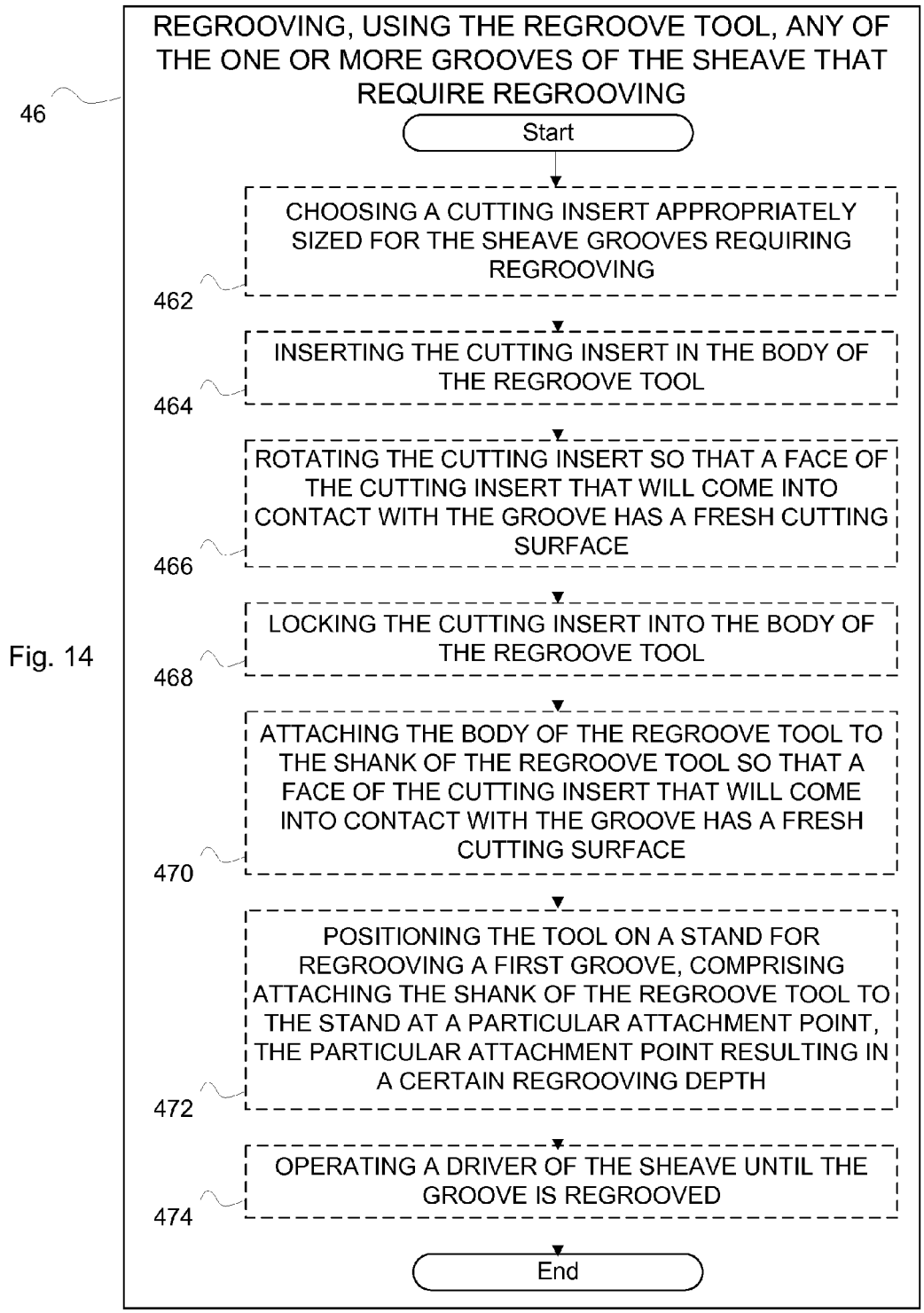
FIG. 14 is a flow diagram of a method for maintaining sheave grooves, in accordance with an embodiment of the invention.

FIG. 14 is a flow diagram for a method of maintaining sheave grooves, in accordance with an embodiment of the invention. In some embodiments, the regrooving, using the regroove tool, any of the one or more grooves of the sheave that require regrooving step 46 may include at least one additional operation. The at least one additional operation may include an operation 462 and/or an operation 464 and/or an operation 466 and/or an operation 468 and/or an operation 470 and/or an operation 472 and/or an operation 474.

The operation 462 includes choosing a cutting insert appropriately sized for the sheave grooves requiring regrooving. The operation 464 includes inserting the cutting insert into the body of the regroove tool. The operation 466 includes rotating the cutting insert so that a face of the cutting insert that will come into contact with the groove has a fresh cutting surface. The operation 468 includes locking the cutting insert into the body of the regroove tool. The operation 470 includes attaching the body of the regroove tool to the shank of the regroove tool so that a face of the cutting insert that will come into contact with the groove has a fresh cutting surface. The operation 472 includes positioning the tool on a stand for regrooving a first groove, comprising attaching the shank of the regroove tool to the stand at a particular attachment point, the particular attachment point resulting in a certain regrooving depth. The operation 474 includes operating a driver of the sheave until the groove is regrooved.

FIG. 15 is a flow diagram for a method of maintaining sheave grooves, in accordance with an embodiment of the invention. In some embodiments, the regrooving, using the regroove tool, any of the one or more grooves of the sheave that require regrooving step 46 may include at least one optional operation. The at least one optional operation may include an operation 476 and/or an operation 478. The operation 476 includes positioning the tool on the stand for regrooving an additional groove, comprising sliding the shank of the regroove tool on the stand to a different attachment point corresponding to the additional groove, the different attachment point having the same regrooving depth as the regrooving depth of the first groove. The operation 478 includes repeating the regrooving steps until all grooves are regrooved.

While preferred and alternative embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method of maintaining sheave grooves, comprising the steps of:
   providing a sheave groove test kit;
   providing a regroove tool;
   determining, using the test kit, whether one or more grooves of a sheave require regrooving; and
   regrooving, using the regroove tool, any of the one or more grooves of the sheave that require regrooving.

2. The method of claim 1, wherein the determining, using the test kit, whether one or more grooves of a sheave require regrooving, comprises the steps of:
   inserting a magnetic standard in each groove on the underside of the sheave not obstructed by a rope;
   holding a straight-edge bar adjacent to the magnetic standards; and
   confirming which of the sheave grooves require regrooving.

3. The method of claim 1, wherein the regrooving, using the regroove tool, any of the one or more grooves of the sheave that require regrooving, comprises the steps of:
   choosing a cutting insert appropriately sized for the sheave grooves requiring regrooving;
   inserting the cutting insert in the body of the regroove tool;
   rotating the cutting insert so that a face of the cutting insert that will come into contact with the groove has a fresh cutting surface;
   locking the cutting insert into the body of the regroove tool;
   attaching the body of the regroove tool to the shank of the regroove tool so that a face of the cutting insert that will come into contact with the groove has a fresh cutting surface;
   positioning the tool on a stand for regrooving a first groove, comprising attaching the shank of the regroove tool to the stand at a particular attachment point, the particular attachment point resulting in a certain regrooving depth; and
   operating a driver of the sheave until the groove is regrooved.

4. The method of claim 3, further comprising the steps of:
   positioning the tool on the stand for regrooving an additional groove, comprising sliding the shank of the regroove tool on the stand to a different attachment point corresponding to the additional groove, the different attachment point having the same regrooving depth as the regrooving depth of the first groove; and
   repeating the step until all grooves are regrooved.

* * * * *